United States Patent [19]
Goshima et al.

[11] Patent Number: 5,163,320
[45] Date of Patent: Nov. 17, 1992

[54] TIRE INSPECTION DEVICE

[75] Inventors: Norio Goshima; Makoto Nakao, both of Tokyo, Japan

[73] Assignee: Bridgestone Corporation, Tokyo, Japan

[21] Appl. No.: 624,002

[22] Filed: Dec. 7, 1990

[30] Foreign Application Priority Data

Dec. 13, 1989 [JP] Japan .................................. 1-322950

[51] Int. Cl.$^5$ ............................................ B60C 23/02
[52] U.S. Cl. .................................. 73/146.5; 301/63.1; 340/442
[58] Field of Search ................... 73/146.5, 146.8, 146; 301/63 PW, 5 R; 340/442, 443, 444; 116/34 R

[56] References Cited

U.S. PATENT DOCUMENTS

| | | | |
|---|---|---|---|
| 3,881,170 | 4/1975 | Hosaka et al. | 73/146.5 |
| 4,173,992 | 11/1979 | Lejeune | 301/63 PW |
| 4,409,586 | 10/1983 | Hochstein | 73/146.5 |
| 4,723,445 | 2/1988 | Ripley et al. | 73/146.5 |
| 4,954,677 | 9/1990 | Alberter et al. | 73/146.5 |
| 4,966,034 | 10/1990 | Bock et al. | 73/146.5 |

Primary Examiner—Donald O. Woodiel
Attorney, Agent, or Firm—Jordan and Hamburg

[57] ABSTRACT

The present invention is a tire inspection device for a tire wheel made from nonmetallic material having a detecting part fitted inside the wheel. The detecting part is equipped with a sensor for detecting the tire internal pressure, the strain of the wheel and the like, and also an electric circuit for conveying out of the wheel an electric signal corresponding to the tire state sensed by the sensor.

8 Claims, 4 Drawing Sheets

TIRE INSPECTION DEVICE

BACKGROUND OF THE INVENTION

The present invention relates to a tire inspection device quite suitable for checking the tire internal pressure and detecting the temperature in the tire, the strain of the tire wheel and the like.

In a tire inspection device disclosed in U.S. Pat. No. 4,918,423, a complicated procedure must be applied to a tire valve to attach the device and, since a wheel thereof is made from metallic materials and signals are sent and received by means of electromagnetic induction, an adverse effect caused by the metal wheel is likely to occur. Moreover, the device is to be incorporated into the tire valve, so it must be fitted in a narrow space while retaining its airtightness. Consequently, it is quite difficult to incorporate complicated functions into the device.

SUMMARY OF THE INVENTION

It is, therefore, an object of this invention to provide a tire inspection device which can be fixed inside a wheel without being incorporated into a tire valve, which can even perform complicated functions, and which can make accurate inspections while eliminating the possibility of erroneous judgement caused by resultant inaccurate electromagnetic induction due to the wheel being made from metallic materials.

In order to achieve the above object, the present invention comprises a detecting part, fitted inside a wheel and equipped with a sensor for detecting tire internal pressure, strain of the tire wheel and the like, and also an electric circuit for conveying out of the wheel an electric signal corresponding to the sensing state of the sensor; and a wheel made from nonmetallic material.

The present invention makes it possible to utilize a detecting part having very high accuracy and performing quite complicated functions, as compared with detecting parts incorporated into tire valves, because it employs a nonmetallic wheel, e.g., a synthetic resin-made wheel, which enables the detecting part to be fitted inside the wheel. In addition, as the detecting part can be incorporated into the wheel at the time of manufacturing the wheel, labor and the like for fitting a detecting part to a prefabricated wheel is eliminated. Moreover, as the detecting part is not fixed on the tire valve, i.e., the detecting part and the valve are separately fitted on the wheel, if the detecting part should be damaged, no adverse effects such as air leakage are produced, because the valve is fitted apart from the detecting device. Futhermore, due to the nonmetallic wheel, no ill influence caused by metallic materials is produced even when electromagnetic induction is used.

DESCRIPTION OF THE PREFERRED EMBODIMENTS

Preferred embodiments of the present invention will now be described with reference to the accompanying drawings.

Figure 1:
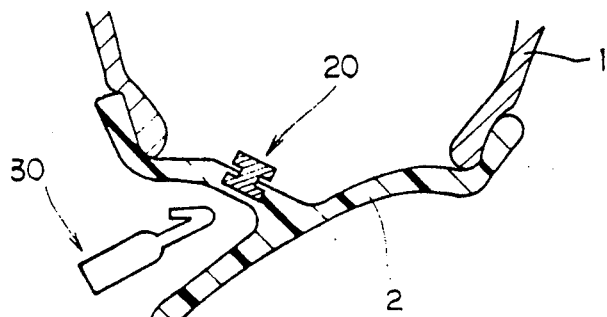
FIG. 1 is a sectional view of a first embodiment of the present invention.
Figure 7:
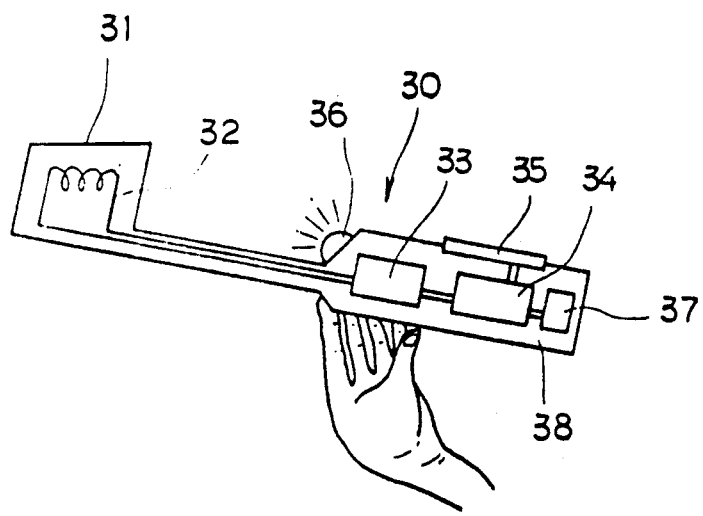
FIG. 7 is a simple block diagram of a detective means.
Figure 8:
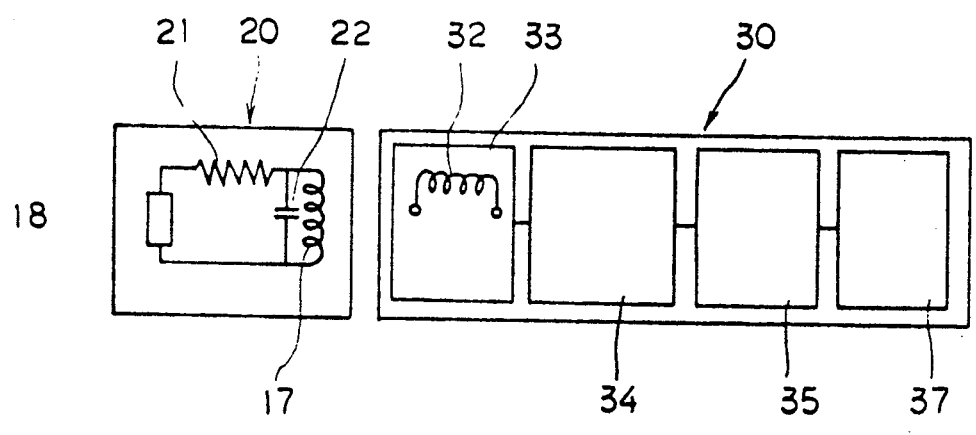
FIG. 8 is a block diagram of an example of the construction of an electric circuit.

A first embodiment shown in FIG. 1 has a wheel 2 made from synthetic resins and a detecting part 20 embedded inside the wheel 2. An example of a suitable detecting part 20 is shown in FIG. 8. Detecting part 20 is equipped with a sensor 18 and an electric circuit for conveying out of the wheel 2 an electric signal corresponding to the sensing state of the sensor 18. The electric circuit consists of a coil 17, a resistor 21 and a capacitor 22. The sensor 18 may function as a temperature sensor, a pressure sensor sensing the tire internal pressure, a strain sensor which can detect strain of the wheel 2, etc. Also, it is possible to fix inside the wheel 2 two or more sensors 18 to provide all these functions. In order to inlay the detecting part 20 as described above inside the wheel 2 and to detect information inside a tire 1, the present invention uses a detective means 30 as shown in FIGS. 7 and 8.

Figure 2:
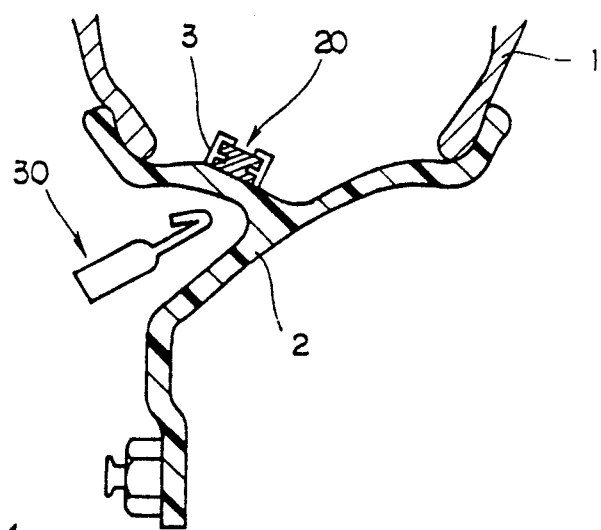
FIG. 2 is a sectional view of a second embodiment.

A second embodiment shown in FIG. 2 has the detecting part 20 fixed inside the wheel 2 made from synthetic resins using a fixing member 3. The structures of the detecting part 20 and detective means 30 in this second embodiment are similar to those of the first embodiment.

Figure 3:
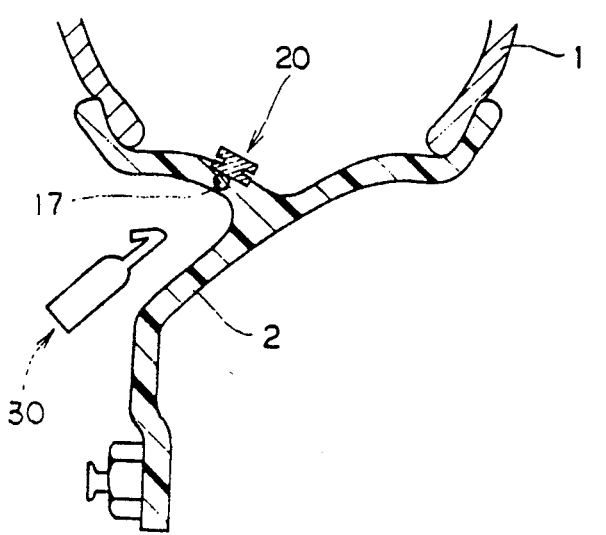
FIG. 3 is a sectional view of a third embodiment
Figure 4:
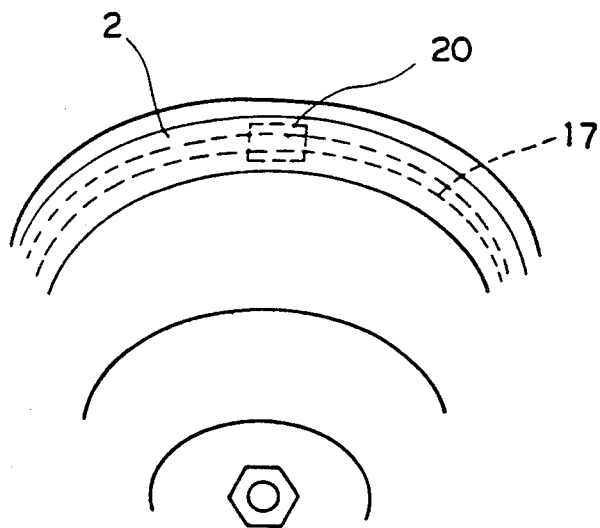
FIG. 4 is a side view of a wheel in the third embodiment.

A third embodiment shown in FIGS. 3 and 4 has the coil 17 in the electric circuit of the detecting part 20 embedded in the circumference of the wheel 2 or fixed in that place from inside. When coil 17 is fixed in that circumference of the wheel 2 as mentioned above, information in the tire can be detected by applying the detective means 30 onto any part of the wheel 2.

Figure 5:
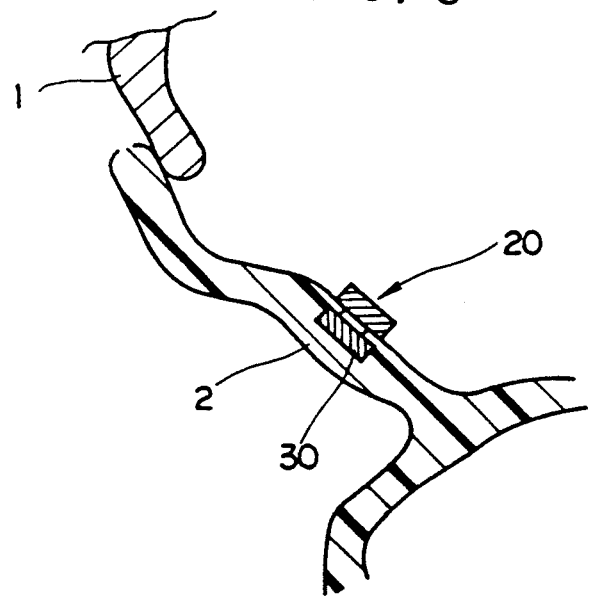
FIG. 5 is a sectional view of a fourth embodiment.
Figure 6:
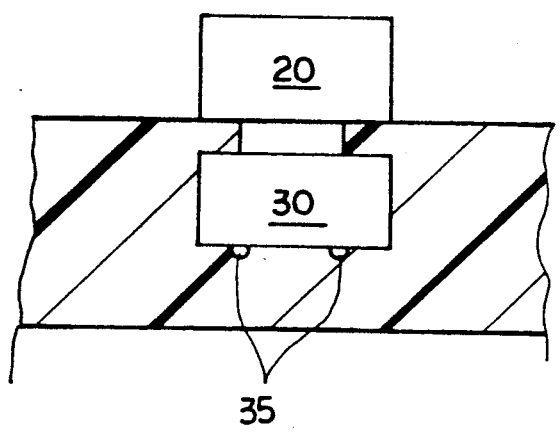
FIG. 6 is a partially expanded sectional view of FIG. 5.

A fourth embodiment shown in FIGS. 5 and 6 has a wheel 2 made from transparent or semi-transparent synthetic resins, and the detecting part 20 and the detective means 30 embedded inside the wheel 2 after being combined into a unit. A battery 37 fitted in the detective means 30 may be an ordinary battery or a solar cell. Detective means 30 includes a display 35, which may either be a green lamp or a red lamp embedded inside the transparent or semi-transparent wheel 2 in the outer direction which is arranged to light up (see FIG. 6), or a numerical value indicator.

In any one of the described embodiments, a small lump or mark is preferably provided on the outside of the wheel 2 at the spot where the detecting part 20 is embedded. In addition, the device can be constructed so as to detect not only the tire internal pressure but also various desired tire information.

As shown in FIGS. 7 and 8, detective means 30 detecting the state of the detecting part 20 has an oscillating coil 32 provided in a front end 31 and an oscillator 33 connected to the oscillating coil 32. The oscillator 33 is connected to a signal processing part 34, and the signal processing part 34 is connected to the display 35. Further, the battery 37, which is the power source of a light 36, the oscillator 33, etc., are housed in a casing 38. The light 36 is mounted so that one can see the above-mentioned small lump or mark provided on the outside of the wheel 2 and a tire valve even in the dark. The display 35 functions, as in the case of the aforementioned prior art, such that when detected information in the tire 1, for example, the tire internal pressure, has the proper value, a green lamp lights and a nice chime sound is produced, and when it is lower than the proper value, a red lamp lights and a warning sound such as a buzzer is produced.

Figure 9:
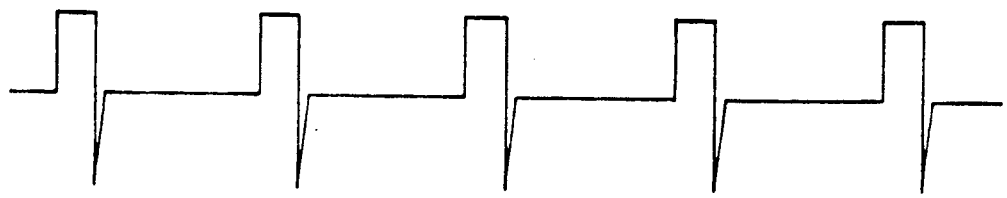
FIGS. 9 to 11 are electrical performance views of a tire inspection device of the present invention.
Figure 10:
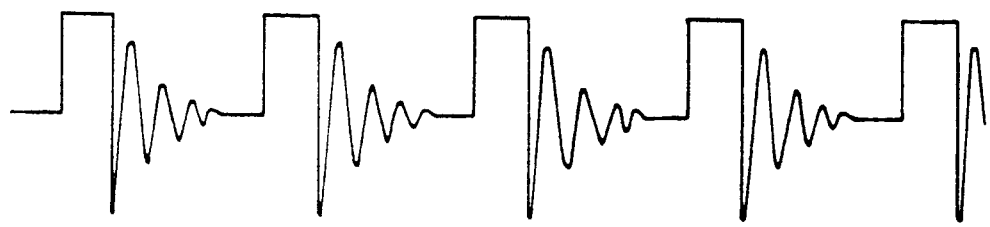
Figure 11:
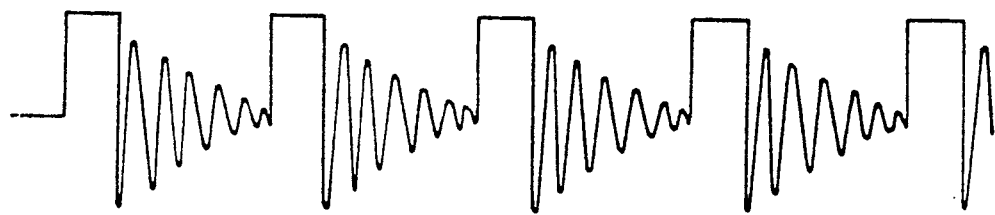

The electric circuit construction of the detective means 30 is composed as shown in FIG. 8. FIG. 9 illustrates a wave form of oscillating current indicating the oscillation state of the oscillator 33 when the front end 31 is separated from the detecting part 20. FIGS. 10 and 11 illustrate wave forms demonstrating that, when the front end 31 approaches the detecting part 20, the oscillating current of the oscillator 33 changes due to the approach to the detecting part 20 fixed in the side of the tire. The wave form illustration in FIG. 10 indicates a state in which the tire internal pressure is in a normal state and the sensor 18 is in the "on" condition, while the wave form of FIG. 11 indicates a state in which the tire internal pressure is lower than the proper value and the sensor 18 is in the "off" condition. That is, the sensor 18 functions in relation to the state of the tire internal pressure, and, in turn, load impedance of the capacitor 22 in the detecting part 20 changes, which brings about a change in the wave forms of FIGS. 10 or 11. The signal processing part 34 detects and makes a comparison, etc., of the change in the wave forms of the output signal from the detecting part 20. When the state is as shown in FIG. 10, the green lamp lights, and when the state is as shown in FIG. 11, the red lamp lights to warn that the tire internal pressure is lower than the proper value.

As described above, the present invention comprises a detecting part, which is fitted inside a wheel and which is equipped with a sensor for detecting tire internal pressure, strain of the tire wheel and the like, and also an electric circuit for conveying out of the wheel an electric signal corresponding to the sensing state of the sensor, and a wheel made from nonmetallic material. Therefore, the present invention need not incorporate a device having complicated functions in a narrow space in a tire valve as in conventional devices; facilitates the working of the device into the wheel, etc.; and eliminates possible trouble caused by metal wheels. Moreover, it is not subject to air leakage should the detecting part be damaged, air-seal leakage from the fixed part, or erroneous judgement affected by metal wheels, etc., and can provide a highly reliable tire inspection device at low cost.

What is claimed is:

1. A tire inspection device comprising a detecting part fitted inside a tire wheel without forming a hole extending through said tire wheel from inside to outside; said detecting part including sensor means for detecting a tire internal condition and an electric circuit comprising a coil and a capacitor for generating an electric signal corresponding to the internal condition detected by said sensor means; said detecting part being fitted as a unit at a discrete location along the circumference of said tire wheel; said wheel being made of nonmetallic material; and said electric signal of said electric circuit being detected by bringing an oscillating coil of a detective means near said coil of said detecting part from outside of said tire wheel at said discrete location.

2. The tire inspection device of claim 1, wherein said wheel is made of synthetic resin.

3. The tire inspection of claim 1, wherein said tire wheel has recognizing means for ascertaining from outside said tire wheel the discrete location of said detecting part along the circumference of said tire wheel.

4. The tire inspection device of claim 3, wherein said recognizing means comprises a small lump on the outside of said tire wheel corresponding to said discrete location of said detecting part along the circumference of said tire wheel.

5. The tire inspection device of claim 3, wherein said recognizing means comprises a mark on the outside of said tire wheel corresponding to said discrete location of said detecting part along the circumference of said tire wheel.

6. A tire inspection device comprising a detecting part fitted inside a tire wheel without forming a hole extending through said tire wheel from inside to outside; said detecting part including sensor means for detecting a tire internal condition and an electric circuit comprising a coil and a capacitor for generating an electric signal corresponding to the internal condition detected by said sensor means; said coil of said detecting part being embedded in a circumference of said tire wheel; said wheel being made of nonmetallic material; and said electric signal of said electric circuit being detected by bringing an oscillating coil of a detective means near said tire wheel.

7. The tire inspection device according to claim 6, wherein said wheel is made of synthetic resin.

8. A tire inspection device comprising a detecting part and a detective means embedded inside a tire wheel as a combined unit without forming a hole extending through said tire wheel from inside to outside; said detecting part including sensor means for detecting a tire internal condition and an electric circuit comprising a coil and a capacitor for generating an electric signal corresponding to the internal condition detected by said sensor means; said detective means being equipped with an oscillator comprising an oscillating coil for providing an oscillating state varying in accordance with variations in said electric signal; and said tire wheel being made of a material selected from the group consisting of transparent synthetic resin and semi-transparent synthetic resin.

* * * * *